(12) United States Patent
Choung

(10) Patent No.: US 9,828,895 B2
(45) Date of Patent: Nov. 28, 2017

(54) EXHAUST GAS POST-PROCESSING SYSTEM

(71) Applicant: HYUNDAI MOTOR COMPANY, Seoul (KR)

(72) Inventor: Jin Woo Choung, Suwon-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/957,232

(22) Filed: Dec. 2, 2015

(65) Prior Publication Data
US 2017/0089240 A1    Mar. 30, 2017

(30) Foreign Application Priority Data
Sep. 30, 2015   (KR) .................. 10-2015-0137908

(51) Int. Cl.
*F01N 3/08* (2006.01)
*B01D 53/94* (2006.01)
(Continued)

(52) U.S. Cl.
CPC ....... *F01N 3/0814* (2013.01); *B01D 53/9477* (2013.01); *F01N 3/035* (2013.01); *F01N 3/0821* (2013.01); *F01N 3/0835* (2013.01); *F01N 3/0842* (2013.01); *F01N 3/103* (2013.01); *F01N 3/2066* (2013.01); *F01N 3/2892* (2013.01); *F01N 13/009* (2014.06); *F01N 13/16* (2013.01);
(Continued)

(58) Field of Classification Search
None
See application file for complete search history.

(56) References Cited

U.S. PATENT DOCUMENTS 6,322,605 B1    11/2001   He et al.
6,805,849 B1 *  10/2004   Andreasson ....... B01D 53/9431
                                                  422/172

(Continued)

FOREIGN PATENT DOCUMENTS

CN   1879961 A  * 12/2006
EP   1486248 A1   12/2004
(Continued)

OTHER PUBLICATIONS

Song et al. CN1879961A—translated document (2006).*
(Continued)

*Primary Examiner* — Walter D Griffin
*Assistant Examiner* — Jelitza Perez
(74) *Attorney, Agent, or Firm* — McDermott Will & Emery LLP

(57) ABSTRACT

An exhaust gas post-processing system includes an oxidation catalyst configured to oxidize substances included in the exhaust gas; a diesel particulate filter configured to collect particulate matters included in the exhaust gas and disposed subsequent to the oxidation catalyst; a dosing module configured to inject a reducing agent and disposed subsequent to the diesel particulate filter; and a selective catalytic reduction configured to remove nitrogen oxide using the reducing agent included in the exhaust gas and disposed subsequent to the dosing module. The diesel particulate filter includes a catalytic component represented by $La_{1-x}Ag_xMnO_3$ (where $0<x<1$).

4 Claims, 3 Drawing Sheets

(51) Int. Cl.
*F01N 13/00* (2010.01)
*F01N 13/16* (2010.01)
*F01N 3/10* (2006.01)
*F01N 3/20* (2006.01)
*F01N 3/28* (2006.01)
*F01N 3/035* (2006.01)

(52) U.S. Cl.
CPC ............ *B01D 2251/2067* (2013.01); *B01D 2255/104* (2013.01); *B01D 2255/1021* (2013.01); *B01D 2255/1023* (2013.01); *B01D 2255/2063* (2013.01); *B01D 2255/2073* (2013.01); *B01D 2255/20707* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01D 2255/904* (2013.01); *F01N 2370/02* (2013.01); *F01N 2370/04* (2013.01); *F01N 2610/02* (2013.01); *Y02T 10/24* (2013.01)

(56) References Cited

U.S. PATENT DOCUMENTS

| | | | |
|---|---|---|---|
| 7,923,408 B2 | 4/2011 | Takahashi et al. | |
| 8,137,648 B2 * | 3/2012 | Jen | F01N 3/035 422/168 |
| 8,844,274 B2 | 9/2014 | Lambert et al. | |
| 2007/0105715 A1 | 5/2007 | Suda et al. | |
| 2009/0324468 A1 * | 12/2009 | Golden | B01D 53/945 423/210 |
| 2012/0159935 A1 | 6/2012 | Li et al. | |
| 2014/0050629 A1 | 2/2014 | Masuda et al. | |
| 2014/0174404 A1 * | 6/2014 | Coldren | F02D 19/0605 123/459 |

FOREIGN PATENT DOCUMENTS

| KR | 10-2005-0114296 A | 12/2005 |
|---|---|---|
| KR | 10-2006-0107757 A | 10/2006 |
| KR | 10-2011-0003098 A | 1/2011 |
| KR | 10-2012-0012068 A | 2/2012 |
| KR | 10-1192185 B1 | 10/2012 |
| KR | 10-2013-0137868 A | 12/2013 |

OTHER PUBLICATIONS

Yoon, D.Y. et al. "A Combinatorial Chemistry Method for Fast Screening of Perovskite-Based NO Oxidation Catalyst", ACS Combinatorial Science, 2014, 16, pp. 614-623.

* cited by examiner

EXHAUST GAS POST-PROCESSING SYSTEM

CROSS-REFERENCE TO RELATED APPLICATION

This application claims the benefit of priority to Korean Patent Application No. 10-2015-0137908, filed in the Korean Intellectual Property Office on Sep. 30, 2015, the entirety of which is incorporated herein by reference.

TECHNICAL FIELD

The present disclosure relates to an exhaust gas post-processing system, and more particularly, to an exhaust gas post-processing system capable of physicochemically reducing harmful substances included in exhaust gas.

BACKGROUND

Generally, a post-processing system for an internal combustion engine is equipped to remove carbon monoxide, hydrocarbons, particulate matter, and nitrogen oxide that are generated from an engine.

The post-processing system may include a diesel oxidation catalyst (DOC), a diesel particulate filter (DPF), a reducing agent injection apparatus and a selective catalytic reduction (SCR).

The diesel oxidation catalyst serves to oxidize carbon monoxide or hydrocarbons included in the exhaust gas, and burn some of the particulate matter using the oxidation heat to reduce the amount of particulate matter.

The diesel particulate filter serves to filter the particulate matter included in the exhaust gas and burn the collected particulate matter at a predetermined temperature to remove the particulate matter.

The reducing agent injection apparatus servers to inject a reducing agent into the exhaust gas and the selective catalytic reduction uses the reducing agent included in the exhaust gas to oxidize/reduce the nitrogen oxide to remove the nitrogen oxide as nitrogen and water.

Methods have been researched for using noble metal components for applications including the diesel oxidation catalyst or the diesel particulate catalyst. These applications include oxidizing and removing the carbon monoxide or the hydrocarbon, and oxidizing the nitrogen monoxide to generate nitrogen dioxide to a later stage thereof. These applications may improve occlusion performance of the selective catalytic reduction for the nitrogen oxide and improve the efficiency thereof.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an exhaust gas post-processing system having advantages of improving performance of a selective catalytic reduction by supplying nitrogen dioxide to later stages of an oxidation catalyst and a diesel particulate filter.

An exemplary embodiment of the present invention provides an exhaust gas post-processing system comprises an oxidation catalyst configured to oxidize substances included in the exhaust gas; a diesel particulate filter configured to collect particulate matters included in the exhaust gas and disposed subsequent to the oxidation catalyst; a dosing module configured to inject a reducing agent and disposed subsequent to the diesel particulate filter; and a selective catalytic reduction configured to remove nitrogen oxide using the reducing agent included in the exhaust gas and disposed subsequent to the dosing module. The diesel particulate filter includes a catalytic component represented by $La_{1-x}Ag_xMnO_3$ (where $0<x<1$).

The diesel particulate filter may include a catalyst component represented by $La_{1-x}Ag_xMnO_3$ (where $0.2 \leq x \leq 0.8$).

The oxidation catalyst may include a catalyst component consisting of platinum and palladium.

The selective catalytic reduction may include a catalyst component consisting of at least one selected from $V_2O_5$, $WO_3$, Cu and Fe.

The selective catalytic reduction may include $V_2O_5$—$WO_3/TiO_2$, Cu-zeolite, or Fe-zeolite.

The reducing agent may include urea.

According to an embodiment of the present invention, the exhaust gas post-processing system uses the catalytic component included in the diesel particulate filter to effectively convert nitrogen monoxide into nitrogen dioxide, thereby maximizing the performance of the selective catalytic reduction of the later stage.

DETAILED DESCRIPTION OF THE EMBODIMENTS

Figure 1:
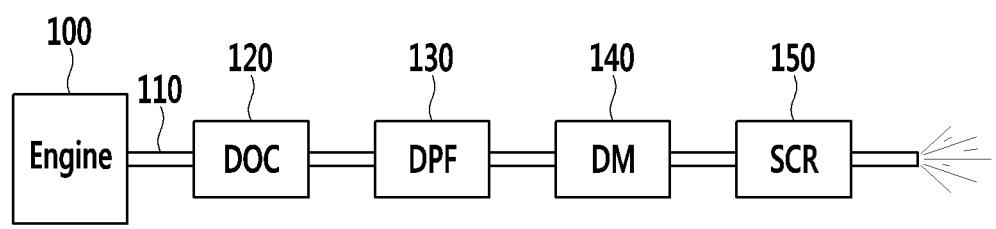
FIG. 1 is a schematic diagram of an exhaust gas post-processing system according to an exemplary embodiment of the present invention.

Various advantages and features of the present inventive concept and methods accomplishing thereof will become apparent from the following description of embodiments with reference to the accompanying drawings. However, the present inventive concept is not limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Throughout the specification, like reference numerals denote like elements.

Accordingly, technologies well known in some exemplary embodiments are not described in detail to avoid an obscure interpretation of the present invention. Unless defined otherwise, it is to be understood that all the terms (including technical and scientific terms) used in the specification has the same meaning as those that are understood by those who skilled in the art. Throughout the specification, unless explicitly described to the contrary, the word "comprise" and variations such as "comprises" or "comprising", will be understood to imply the inclusion of stated elements but not the exclusion of any other elements. Further, unless explicitly described to the contrary, a singular form includes a plural form in the present specification.

FIG. 1 is a schematic diagram of an exhaust gas post-processing system according to an exemplary embodiment of the present invention.

Referring to FIG. 1, the exhaust gas post-processing system includes an engine 100, an exhaust line 110, an oxidation catalyst 120, a diesel particulate filter 130, a dosing module 140, and a selective catalytic reduction 150.

The oxidation catalyst 120, the diesel particulate filter 130, the dosing module 140, and the selective catalytic reduction 150 are sequentially disposed in the exhaust line 110 and the exhaust gas is purified by them before being emitted to the outside.

The oxidation catalyst 120 oxidizes hydrocarbons and carbon monoxide included in the exhaust gas, and the diesel particulate filter 130 collects particulate matters included in the exhaust gas and burns them under a predetermined temperature condition to be removed.

Further, the oxidation catalyst 120 converts nitrogen monoxide (NO) included in the exhaust gas into nitrogen dioxide ($NO_2$) and the diesel particulate filter 130 naturally regenerates the collected particulate matter by increasing the temperature by the oxidation reaction of the oxidation catalyst 120.

The oxidation catalyst 120 may include a catalyst component consisting of platinum (Pt) and palladium (Pd). In detail, the oxidation catalyst 120 may include a catalyst component in which a molar ratio of platinum (Pt) and palladium (Pd) is 4:1.

According to the exemplary embodiment of the present invention, the diesel particulate filter 130 includes the catalyst component represented by $La_{1-x}Ag_xMnO_3$ (where 0<x<1), in which the catalyst component oxidizes the nitrogen monoxide included in the exhaust gas into the nitrogen dioxide to be supplied to a later stage. Here, the selective catalytic reduction 150 uses the nitrogen dioxide supplied from the diesel particulate filter 130 to maximize purification efficiency of the nitrogen oxide.

The oxidation of the particulate matter is also promoted by a reaction of the nitrogen dioxide with the particulate matter while the nitrogen monoxide is being oxidized into nitrogen dioxide.

The catalyst component represented by $La_{1-x}Ag_xMnO_3$ (where 0<x<1) increases a conversion of the nitrogen monoxide in, in particular, a low temperature area of 200 to 300° C. In more detail, the diesel particulate filter may include a catalyst component represented by $La_{1-x}Ag_xMnO_3$ (however, 0.2≤x≤0.8).

The dosing module 140 injects a reducing agent into the exhaust line 110, in which the reducing agent may include urea. The selective catalytic reduction 150 uses the reducing agent injected from the dosing module 140 to remove the nitrogen oxide included in the exhaust gas.

The selective catalytic reduction 150 uses the nitrogen dioxide supplied from the diesel particulate filter 130 to maximize purification efficiency of the nitrogen oxide. In detail, the selective catalytic reduction may include a catalyst component consisting of at least one selected from $V_2O_5$, $WO_3$, Cu and Fe. In more detail, the selective catalytic reduction may include $V_2O_5$—$WO_3$/$TiO_2$, Cu-zeolite, or Fe-zeolite.

When a volume ratio of the nitrogen monoxide and the nitrogen dioxide in the exhaust gas at a front stage of the selective catalytic reduction 150 is 1:1, the purification efficiency of the nitrogen oxide is improved in the low temperature area of 200 to 350° C. due to an SCR reaction.

According to the exemplary embodiment of the present invention, the purification efficiency of the nitrogen oxide of the selective catalytic reduction 150 is improved by supplying the nitrogen dioxide ($NO_2$) to the later stage by the catalyst component included in the diesel particulate filter 130.

Hereinafter, various Examples of the prevent inventive concept and Comparative Example will be described. However, the following Examples are only the preferred Examples and therefore the present invention is not limited to the following Examples.

Preparation Example: Preparing of Perovskite Monolith-Type Catalytic Reactor

A perovskite monolith-type catalytic reactor for NO oxidation performance evaluation coats a cordierite substrate with perovskite by a general dipping method. The cordierite substrate used for coating used a 400 cpsi cell monolith having a diameter of 0.7 in and a height of 0.57 in. Dipping→air blowing→drying (110° C.) were repeated on slurry prepared by mixing perovskite catalyst and distilled water at a predetermined ratio and performing ball-milling thereon until 40 wt % against the cordierite is supported in the substrate. Finally, the coated monolith catalytic reactor was fired for five hours under air atmosphere of 700° C. and then the NO oxidation performance evaluation was performed by the following evaluation method.

Evaluation Method: NO Oxidation Performance Evaluation

The NO oxidation performance evaluation was performed in a fixed bed continuous flow reactor system and used the monolith-type catalytic reactor upon the evaluation. The injected reaction gas concentration was NO of 400 ppm, $O_2$ of 8%, $H_2O$ of 10%, and a balance of $N_2$, the reactor space speed was maintained at 30,000 $h^{-1}$ upon the evaluation, and a change in the reaction gas concentration after and before the reaction was analyzed by an FT-IR (Nicolet 6700, Thermo Electronic Co.) connected to the reactor online.

Example 1

The exhaust gas including NO of 400 ppm as a volume %, $O_2$ of 8%, $H_2O$ of 10%, and a balance of $N_2$ was supplied to the monolith catalyst coated with a $La_{0.9}Ag_{0.1}MnO_3$ catalyst at a space speed of 30,000 $h^{-1}$.

Figure 2:
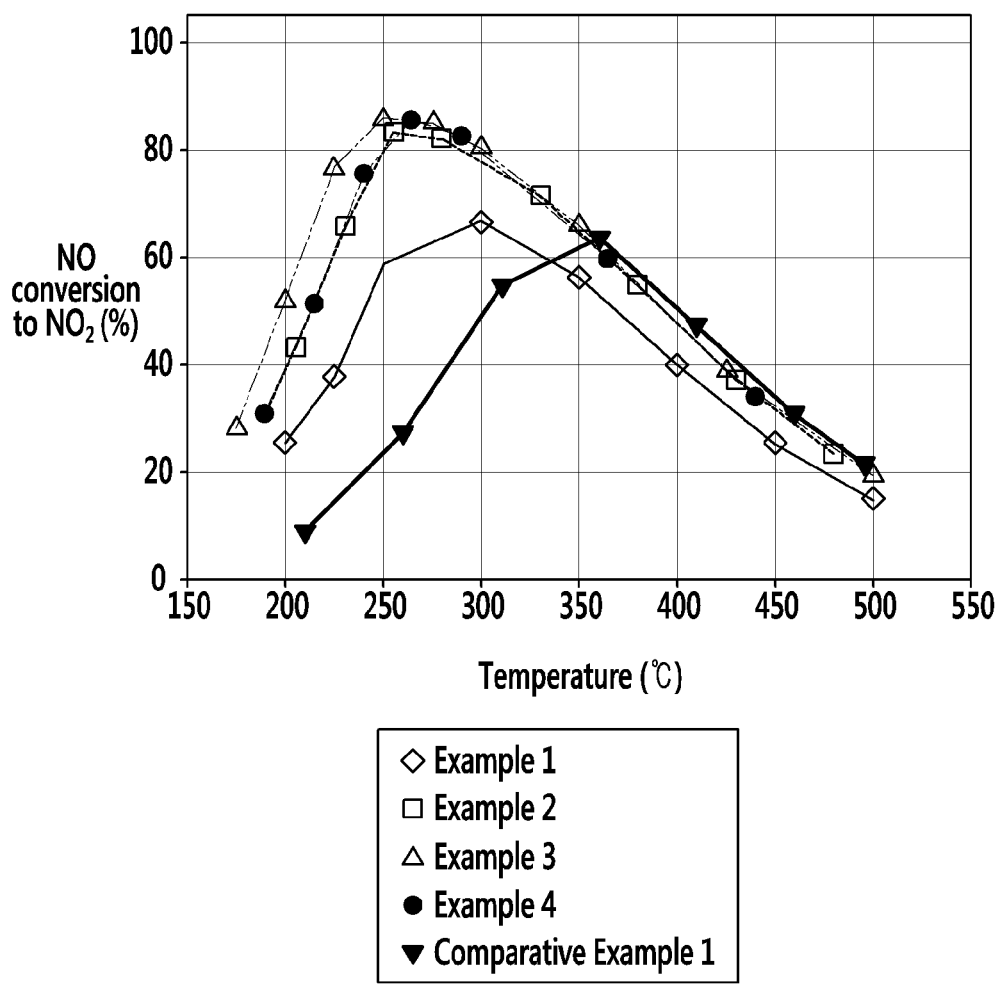
FIG. 2 is a graph illustrating reaction temperatures and a conversion of nitrogen monoxide of a diesel particulate filter in Examples 1 to 4 and Comparative Example 1.

A conversion of NO for each temperature was measured by the foregoing evaluation method and the measurement results were shown in FIG. 2.

Example 2

Example 2 was performed by the same method as Example 1 except that the monolith catalyst coated with the $La_{0.8}Ag_{0.2}MnO_3$ catalyst was prepared.

The conversion of NO for each temperature was measured by the foregoing evaluation method and the measurement results were shown in FIG. 2.

Example 3

Example 3 was performed by the same method as Example 1 except that the monolith catalyst coated with an $La_{0.5}Ag_{0.5}MnO_3$ catalyst was prepared.

The conversion of NO for each temperature was measured by the foregoing evaluation method and the measurement results were shown in FIG. 2.

Example 4

Example 4 was performed by the same method as Example 1 except that the monolith catalyst coated with the $La_{0.2}Ag_{0.8}MnO_3$ catalyst was prepared.

The conversion of NO for each temperature was measured by the foregoing evaluation method and the measurement results were shown in FIG. 2.

Comparative Example 1

Comparative Example 1 was performed by the same method as Example 1 except that the monolith catalyst coated with the $La_{0.9}Sr_{0.1}MnO_3$ catalyst was prepared.

The conversion of NO for each temperature was measured by the foregoing evaluation method and the measurement results were shown in FIG. 2.

It could be appreciated from FIG. 2 that the monolith catalyst coated with the perovskite manufactured in Examples 1 to 4 has the excellent conversion of the nitrogen monoxide and in particular, has the more excellent conversion in the low temperature area of 200 to 300° C.

Experimental Example 1: Nitrogen Oxide Removal Experiment

The exhaust gas including NO of 400 ppm as a volume %, $O_2$ of 8%, $H_2O$ of 10%, and a balance of $N_2$ was supplied to 1.1 cc of the $La_{0.5}Ag_{0.5}MnO_3$ catalyst prepared at a 20/30 mesh at a space speed of 60,000 h$^{-1}$ at 250° C. The passing exhaust gas was added with the reaction gas so that the whole reaction gas becomes $NH_3$ of 500 ppm, NOx of 500 ppm, $O_2$ of 5.6%, $H_2O$ of 10%, and a balance of $N_2$ to flow in 0.95 cc of $V_2O_5$—$WO_3/TiO_2$ selective catalytic reduction prepared at the 20/30 mesh at a space speed of 100,000 h$^{-1}$.

Figure 3:
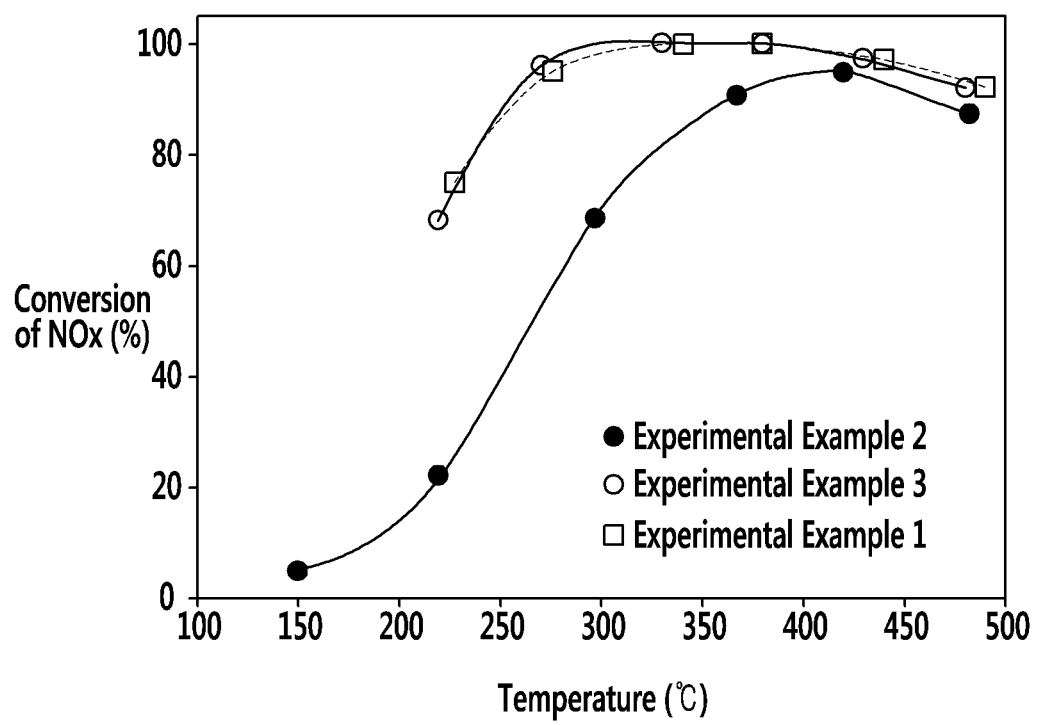
FIG. 3 is a graph illustrating a conversion of nitrogen oxide in the exhaust gas post-processing system according to Examples 1 to 3.

The conversion of nitrogen oxide (NOx) of the exhaust gas passing through the selective catalytic reduction was measured and the measured results were shown in FIG. 3.

Experimental Example 2

The $La_{0.5}Ag_{0.5}MnO_3$ catalyst was not disposed at a front stage of the selective catalytic reduction and only the $V_2O_5$—$WO_3/TiO_2$ selective catalytic reduction was disposed.

The exhaust gas including $NH_3$ of 500 ppm as a volume %, NO of 500 ppm, $O_2$ of 5%, $H_2O$ of 10%, and a balance of $N_2$ was supplied to the selective catalytic reduction at the space speed of 100,000 h$^{-1}$.

The conversion of nitrogen oxide (NOx) of the exhaust gas passing through the selective catalytic reduction was measured and the measured results were shown in FIG. 3.

Experimental Example 3

The $La_{0.5}Ag_{0.5}MnO_3$ catalyst was not disposed at a front stage of the selective catalytic reduction and only the $V_2O_5$—$WO_3/TiO_2$ selective catalytic reduction was disposed.

The exhaust gas including $NH_3$ of 500 ppm as a volume %, NO of 250 ppm, $NO_2$ of 250 ppm, $O_2$ of 5%, $H_2O$ of 10%, and a balance of $N_2$ was supplied to the selective catalytic reduction at the space speed of 100,000 h$^{-1}$.

The conversion of nitrogen oxide (NOx) of the exhaust gas passing through the selective catalytic reduction was measured and the measured results were shown in FIG. 3.

It could be confirmed from FIG. 3 that the conversion of the nitrogen oxide of the exhaust gas post-processing system including the $La_{0.5}Ag_{0.5}MnO_3$ catalyst at the front stage of the selective catalytic reduction may have the excellent conversion of the nitrogen oxide and approximately the same conversion as Experimental Example 3 in which the volume ratio of nitrogen monoxide and nitrogen dioxide is controlled to be 1:1 may be obtained. In particular, it could be confirmed that the conversion of the nitrogen oxide is excellent in the low temperature area of 250 to 350° C.

The regeneration Experiment of the particulate matters used the diesel engine to measure the purification performance of PM after 60 minutes and 12 minutes are maintained under the condition that the temperature of the front stage of the DPF is 350° C. and 640° C., respectively. The evaluation layout is configured of a DOC+DPF system, the DOC catalyst uses the monolith catalyst coated with a catalyst having a noble metal ratio of 2 Pt/1 Pd, the DPF coated with a noble metal catalyst having a noble metal ratio of 1 Pt/1 Pd, the $La_{0.5}Ag_{0.5}MnO_3$ catalyst, an $Ag/CeO_2$ catalyst, respectively, was used to perform the comparison evaluation.

Experimental Example 4: Particulate Matter Regeneration Experiment

The DPF coated with the noble catalyst having 1 Pt/1 Pd measured the particulate matter regeneration result and the measured results were arranged in the following Table 1.

Experimental Example 5

The DPF coated with the $La_{0.5}Ag_{0.5}MnO_3$ catalyst measured the particulate matter regeneration result and the measured results were arranged in the following Table 1.

Experimental Example 6

The DPF coated with the $Ag/CeO_2$ catalyst measured the particulate matter regeneration result and the measured results were arranged in the following Table 1.

TABLE 1

|  | Regeneration at 350° C. | Regeneration at 640° C. |
|---|---|---|
| Experimental Example 4 | 20% | 70% |
| Experimental Example 5 | 30% | 69% |
| Experimental Example 6 | 17% | 64% |

As illustrated in the above Table 1, in the Experimental Example 4, it could be confirmed that the regeneration rates are equal or excellent at both of the temperatures of 350° C. and 640° C. and, in particular, the regeneration ratios are excellent in a region of 350° C.

As the NO is oxidized into the $NO_2$ in the diesel particulate filter according to the exemplary embodiment of the present invention, it may be confirmed that the particulate matters are oxidized by the reaction of the particulate material with the $NO_2$.

The present invention is not limited to the above Examples but may be manufactured in different various forms and it may be understood that a person having ordinary skilled in the art to which the present invention pertains may perform the present invention other detailed forms without changing the technical ideas or the essential features of the present invention. Therefore, it should be understood that the above-mentioned embodiments are not restrictive but are exemplary in all aspects.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An exhaust gas post-processing system, comprising:
    an oxidation catalyst configured to oxidize substances included in the exhaust gas;
    a diesel particulate filter configured to collect particulate matters included in the exhaust gas and disposed subsequent to the oxidation catalyst;
    a dosing module configured to inject a reducing agent and disposed subsequent to the diesel particulate filter; and
    a selective catalytic reduction configured to remove nitrogen oxide using the reducing agent included in the exhaust gas and disposed subsequent to the dosing module,
    wherein the diesel particulate filter includes a catalytic component represented by $La_{1-x}Ag_xMnO_3$ (where $0<x<1$), and
    wherein the selective catalytic reduction includes $V_2O_5$—$WO_3/TiO_2$.

2. The exhaust gas post-processing system of claim 1, wherein:
    the diesel particulate filter includes a catalyst component represented by $La_{1-x}Ag_xMnO_3$ (where $0.2 \leq x \leq 0.8$).

3. The exhaust gas post-processing system of claim 1, wherein:
    the oxidation catalyst includes a catalyst component consisting of platinum and palladium.

4. The exhaust gas post-processing system of claim 1, wherein:
    the reducing agent includes urea.

* * * * *